Nov. 15, 1966  D. B. BAUMUNK  3,284,936
CHECK LIST HOLDER

Filed Feb. 11, 1966

INVENTOR.
DEAN B. BAUMUNK
BY
AGENT.

Nov. 15, 1966  D. B. BAUMUNK  3,284,936
CHECK LIST HOLDER
Filed Feb. 11, 1966  4 Sheets-Sheet 2
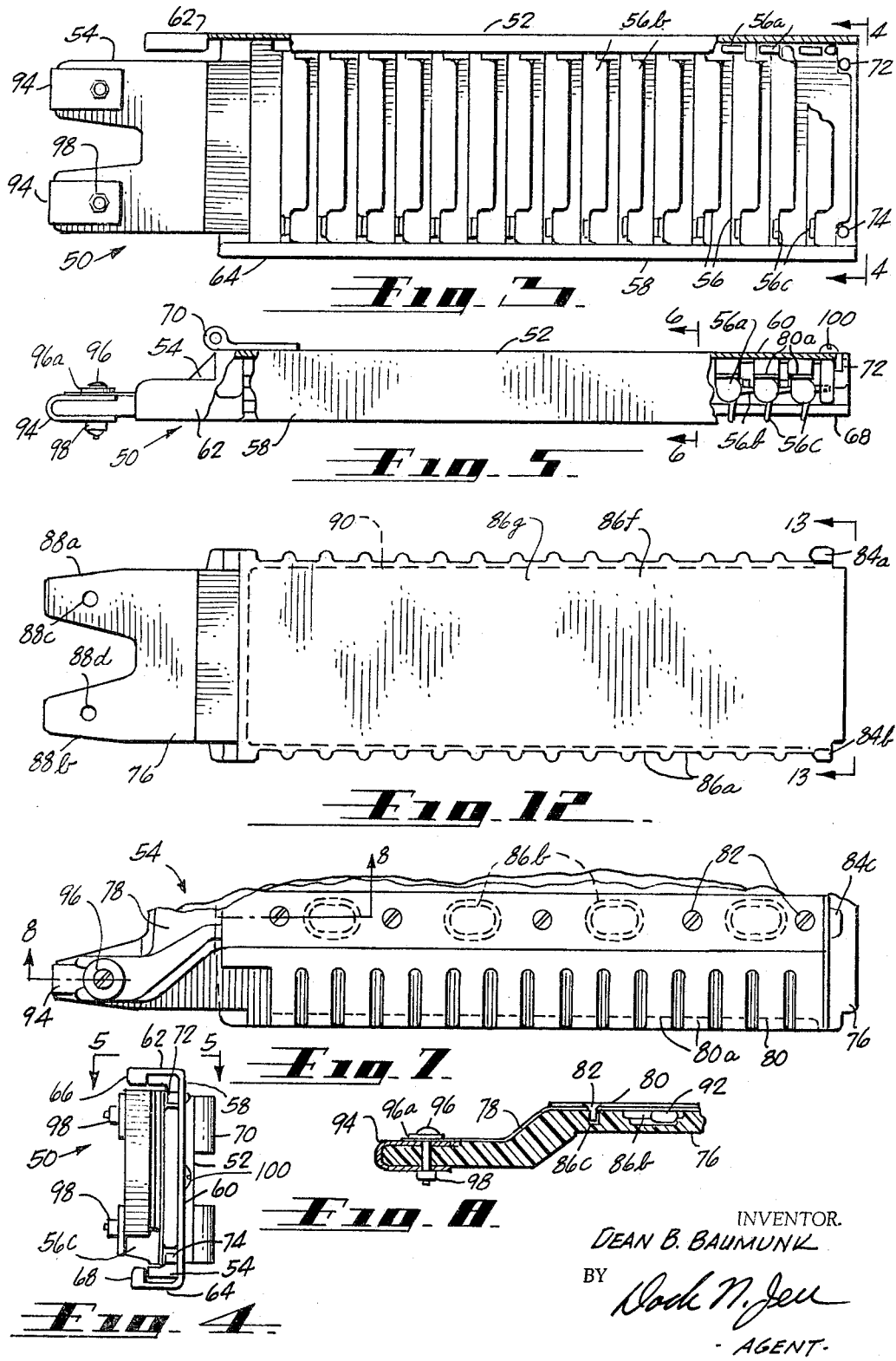
INVENTOR.
DEAN B. BAUMUNK
BY
- AGENT -

Nov. 15, 1966  D. B. BAUMUNK  3,284,936
CHECK LIST HOLDER
Filed Feb. 11, 1966  4 Sheets-Sheet 3
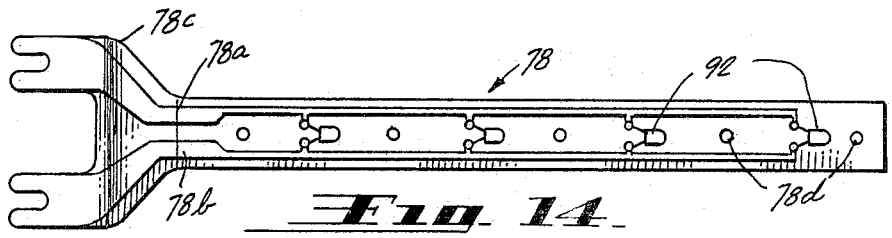
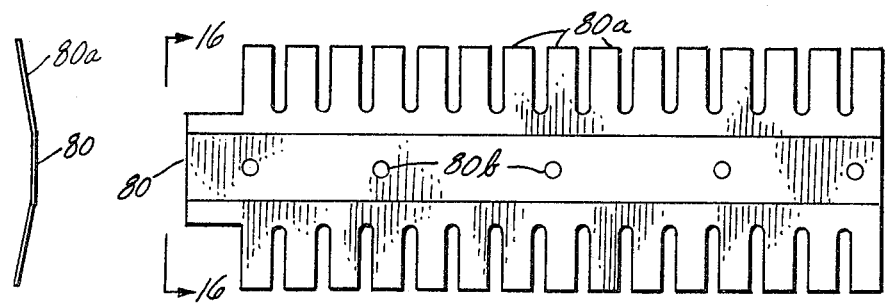
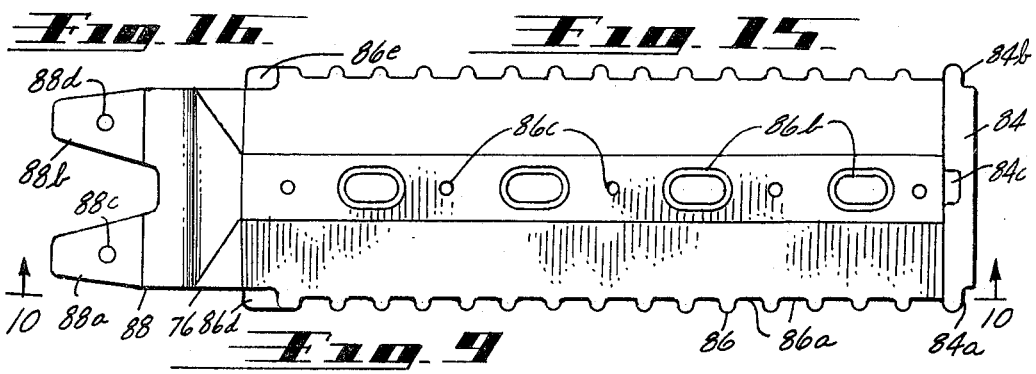
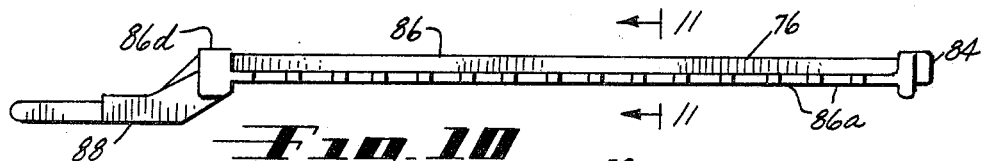
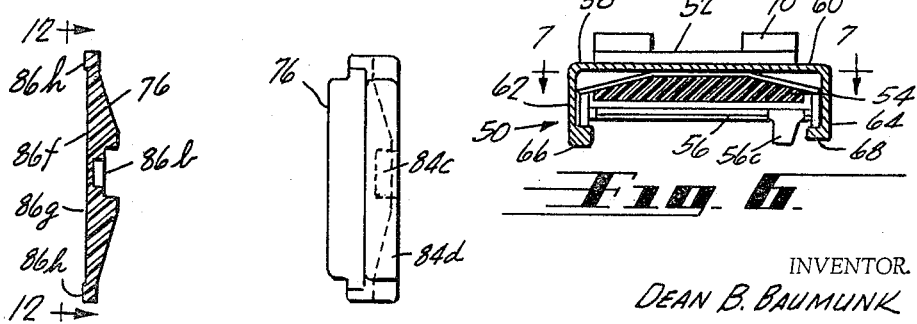
INVENTOR.
DEAN B. BAUMUNK
BY
— AGENT —

Nov. 15, 1966  D. B. BAUMUNK  3,284,936
CHECK LIST HOLDER
Filed Feb. 11, 1966  4 Sheets-Sheet 4
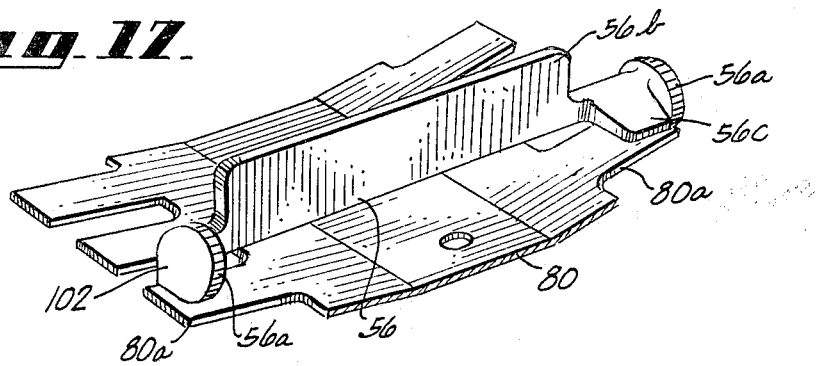
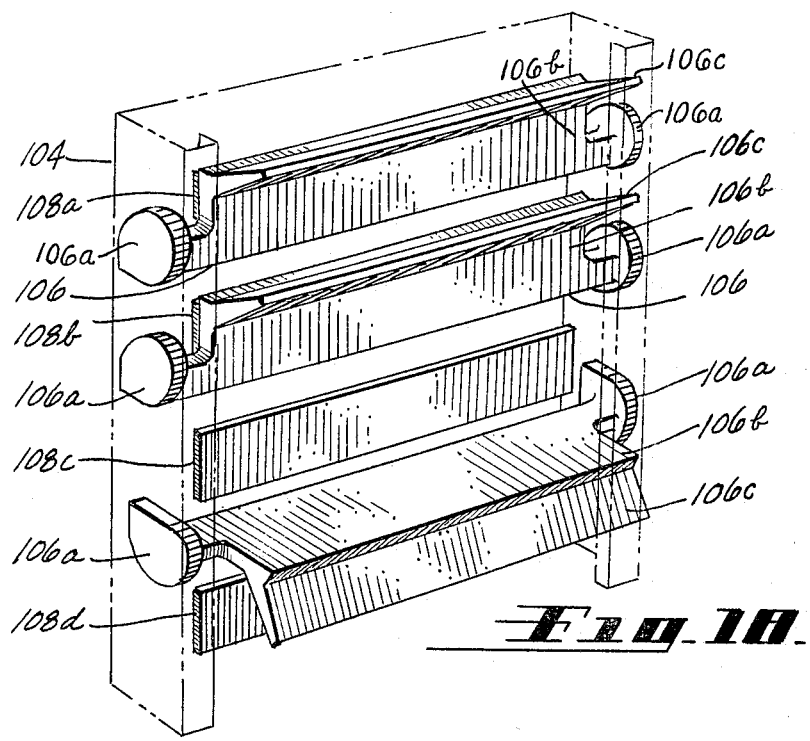
INVENTOR.
DEAN B. BAUMUNK
BY
-AGENT- United States Patent Office 3,284,936
Patented Nov. 15, 1966

3,284,936
CHECK LIST HOLDER
Dean B. Baumunk, Palos Verdes Estates, Calif., assignor to Douglas Aircraft Company, Inc., Santa Monica, Calif.
Filed Feb. 11, 1966, Ser. No. 526,739
10 Claims. (Cl. 40—61)

My invention relates generally to check list holders and more particularly to a mechanical check list holder device which is useful in obtaining an accurate checkoff of a number of different functional operations or items that are to be performed or checked as, for example, during the various flight phases of an airplane or the like.

It is an object of this invention to provide a check list holder device which is simple to operate, and provides a highly accurate and reliable system for checking off a number of different functional operations or items which are to be performed or checked.

Another object of the invention is to provide a check list holder device which will be automatically illuminated upon use and clearly light up items on the check list mounted in the holder device.

A further object of this invention is to provide a check list holder device which readily permits a reliable, sequential checkoff operation of a few to a large number of items.

A still further object of the invention is to provide a check list holder device wherein a number of items can be efficiently checked off by operation thereof, and only a single item is exposed by the holder device at any instant.

Other objects and features of my invention will become apparent, and the advantages thereof will be made clear, from the following detailed description of the invention, to be taken in conjunction with the accompanying drawings, in which:

FIGURE 3 is a bottom plan view of a check list holder device according to this invention;

FIGURE 4 is a frontal end view of the holder device as taken along the line 4—4 indicated in FIGURE 3;

FIGURE 5 is a side elevational view of the holder device as taken along the line 5—5 indicated in FIGURE 4;

FIGURE 6 is a cross sectional view of the holder device as taken along the line 6—6 indicated in FIGURE 5;

FIGURE 7 is a fragmentary, top plan view of a light plate assembly of the holder device;

FIGURE 8 is a fragmentary, sectional view of the light plate assembly as taken along the line 8—8 indicated in FIGURE 7;

FIGURE 9 is a top plan view of the light plate of the light plate assembly shown in FIGURES 7 and 8;

FIGURE 10 is a side elevational view of the light plate as taken along the line 10—10 indicated by FIGURE 9;

FIGURE 11 is a cross-sectional view of the light plate as taken along the line 11—11 indicated in FIGURE 10;

FIGURE 12 is a bottom plan view of the light plate;

FIGURE 13 is a frontal end view of the light plate as taken along the line 13—13 indicated in FIGURE 12;

FIGURE 14 is a bottom plan view of a printed circuit sheet which is part of the light plate assembly;

FIGURE 15 is a top plan view of a spring used in the light plate assembly;

FIGURE 16 is an end view of the spring as taken along the line 16—16 indicated in FIGURE 15;

FIGURE 17 is a fragmentary, simplified perspective view of a cam-flap element working in cooperation with the spring of the holder device; and FIGURE 18 is a fragmentary, greatly simplified perspective view of a check list holder device utilizing another version of a cam-flap element.

Figure 1:
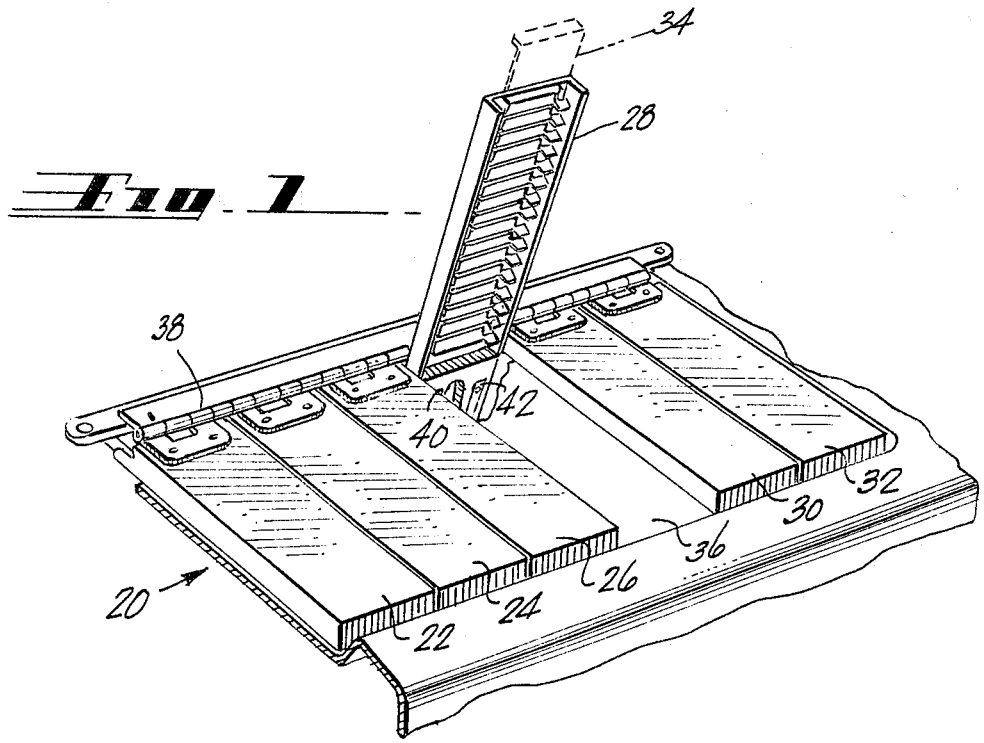
FIGURE 1 is a fragmentary, perspective view of a check list holder assembly as installed, for example, in the cockpit of an airplane.

FIGURE 1 is a fragmentary, perspective view of a check list holder assembly 20 as installed, for example, in the cockpit of an airplane. The assembly 20 includes, in this instance, six check list holders 22, 24, 26, 28, 30 and 32 which normally hold check lists for the different flight phases of an airplane, as for the before takeoff phase, after takeoff, etc. A check list is itemized on a sheet 34 which is shown partially withdrawn in phantom lines from the holder 28. The assembly 20 can be located in a flat, recessed area 36 which is near the copilot. The holders 22 through 32 are each mounted to a hinge 38 such that each holder can be rotatably raised from a flat position to an upright position and back down. A raised holder is maintained in that position by spring contacts (shown in FIGURE 2) which engage respective leg wiper contacts 40 and 42 of the raised holder. The spring contacts also serve to provide an electrical contact with the leg wiper contacts 40 and 42 to energize and illuminate the raised holder.

Figure 2:
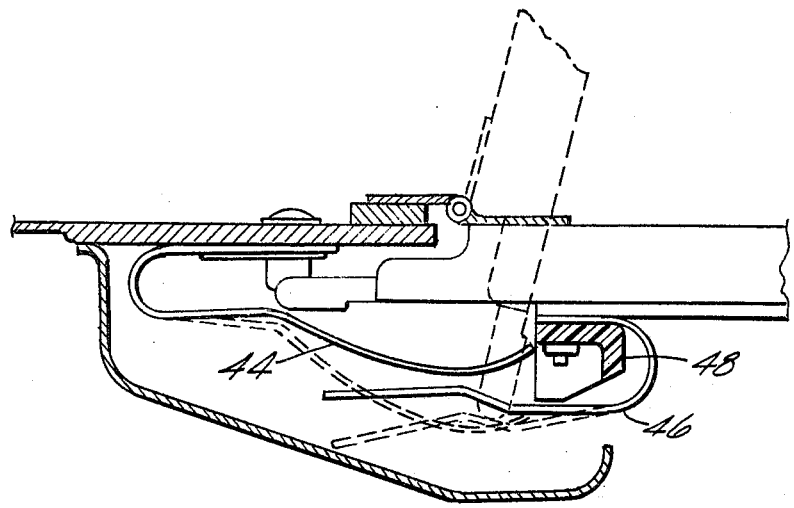
FIGURE 2 is a fragmentary, generally sectional view showing the cooperation between a check list holder device and certain control springs in accordance with my invention.

FIGURE 2 is a fragmentary, generally sectional view showing a satisfactory configuration of spring contacts 44 and 46 for engaging the wiper contacts 40 and 42, respectively. The spring contacts 44 and 46 are suitably insulated from their mounting structure and are connected to respective electrode terminals of a source of electrical power (not shown). The spring contacts 44 and 46 are leaf springs having a width somewhat greater than that of the wiper contacts 40 and 42, and are appropriately spaced from each other such that the spring contacts 44 and 46 are aligned with their respective engaging wiper contacts 40 and 42. The spring contact 44 is curved as shown in FIGURE 2 to provide a spring load which generally tends to return a holder back to its flat or down position. The spring contact 46, however, has an offset or reverse bend which tends to hold the holder in an upright position such that its legs are held against a non-conductive stop bar 48.

FIGURE 3 is a bottom plan view of a check list holder 50, FIGURE 4 is a frontal end view of the holder 50 as taken along the line 4—4 indicated in FIGURE 3, FIGURE 5 is a side elevational view of the holder 50 as taken along the line 5—5 indicated in FIGURE 4 and FIGURE 6 is a cross sectional view of the holder 50 as taken along the line 6—6 indicated in FIGURE 5. It is believed that joint reference to these figures, rather than in sequence, will give an easier comprehension of the structure of the holder 50. The holder 50 can be viewed as having three main parts. These are the housing assembly 52, light plate assembly 54, and cam-flaps 56. The structural portion of the holder 50 including the housing assembly 52 and the light plate assembly 54 can be conveniently referred to as the housing-plate structure of the check list holder. The principal part of the housing assembly 52 is a channel bar 58 having a horizontal or flat web 60 with vertically dependent side flanges 62 and 64. The lower edges of the flanges 62 and 64 are each turned inwardly a short distance as indicated in FIGURES 3, 4 and 6 to form ledges 66 and 68.

A hinge section 70 is riveted or otherwise suitably secured to the web 60 on one end thereof, and stud pins 72 and 74 are attached to the web 60 at the other end as shown in FIGURES 3, 4 and 5. As can be seen in FIGURES 3 and 5, the left (upper side in the bottom plan view of FIGURE 3) flange 62 extends longitudinally a greater distance beyond the corresponding end of the right flange 64. The purpose of this longer end is to engage structure of the recessed area 36 (FIGURE 2) when the holder is raised to its upright position and protect the light plate assembly 54 from striking any structure. The stud pins 72 and 74 serve as stops which engage the end of the light plate assembly 54 when it is fully installed in the housing assembly 52.

FIGURE 7 is a fragmentary, top plan view of the light plate assembly 54, less the housing assembly 52, and FIGURE 8 is a fragmentary, sectional view of the light plate assembly 54 as taken along the line 8—8 indicated in FIGURE 7. The assembly 54 generally includes three main parts. These are the light plate 76, printed circuit sheet 78 and spring 80. The light plate 76 forms the normally lower part of the assembly 54 and this is followed by the circuit sheet 78 which is positioned on the light plate 76. Spring 80 is placed over the circuit sheet 78 and screws 82 are used to secure the circuit sheet 78 and the spring 80 to the light plate 76. The precise arrangement and combination of the different parts of the light plate assembly 54 will be more readily comprehended from a consideration of its different parts which are described below.

FIGURE 9 is a top plan view of the light plate 76, FIGURE 10 is a side elevational view of the light plate 76 as taken along the line 10—10 indicated in FIGURE 9, FIGURE 11 is a cross sectional view of the light plate 76 as taken along the line 11—11 indicated in FIGURE 10, FIGURE 12 is a bottom plan view of the light plate 76, and FIGURE 13 is a frontal end view of the light plate 76 as taken along the line 13—13 indicated in FIGURE 12. These figures, together, illustrate in detail the structure of the light plate 76 which is preferably fabricated from transparent sheet acrylic suitably shaped and painted with white and black paint.

It can be seen from FIGURE 9 that the light plate 76 is generally rectangular in shape, having an end section 84 including shoulders 84a and 84b, and a recess 84c; a body section 86 including edge notches 86a, four oval lamp recesses 86b, five tapped holes 86c, and two protuberances 86d and 86e; and a leg section 88 including the legs 88a and 88b with their respective apertures 88c and 88d. The entire upper surface as can be seen in FIGURE 9 is painted black on white except for the four lamp recesses 86b which are left white. The notches 86a are provided adjacent to the lower, flat face 86f (FIGURE 12) of the body section 86 and the leg section 88 is offset below the plane of the face 86f as illustrated in FIGURE 10. It is noted that the upper surface of the legs 88a and 88b is depressed slightly below the adjacent upper surface of the leg section 88. Both sides of the body section 86 are painted black on white except that it is left white on the sides of the end section 84.

The body section 86 has a generally trapezoidal cross section as shown in FIGURE 11. The face 86f has a central portion 86g which is very slightly depressed from the edges 86h such that the central portion will accommodate a check list sheet similar to the sheet 34 indicated in FIGURE 1. The face 86f is more clearly shown in FIGURE 12 and the entire surface as seen in this figure is painted black on white except for the area or portion 86g enclosed by the broken line 90. The portion 86g is only painted white since the check list sheet is positioned just before it. The areas visible in the frontal end view of the light plate 76 shown in FIGURE 13 are painted black on white except for the end area 84d which is painted white on black on white.

FIGURE 14 is a bottom plan view of the printed circuit sheet 78 which is a thin and relatively flexible element. The circuit sheet 78 is etched to provide two conducting strips 78a and 78b on the non-conducting base 78c. The circuit sheet 78 is shaped as shown, and small lamps 92 are connected (soldered) in parallel to the conducting strip 78a and 78b. Small holes 78d are also provided in the circuit sheet 78 as illustrated.

FIGURES 15 and 16 illustrate the structure of the spring 80 in detail. The spring 80 is preferably made from a thin beryllium copper strip which is angularly bent as shown to match the upper trapezoidal surface of the body section 86. The spring 80 is notched on both sides to provide a series of independent leaf spring fingers or elements 80a. The spring 80 also has five small holes 80b provided along the longitudinal axis thereof. The printed circuit sheet 78 with the lamps 92 connected thereto is preferably, but not necessarily, cemented to the lower (concave) sides of the spring 80 with the holes 78d aligned with the holes 80b.

The spring 80 with its cemented printed circuit sheet 78 is fitted onto the upper trapezoidal surface of the body section 86 of the light plate 76 such that the lamps 92 are positioned within the oval recesses 86b, and the spring fingers 80a are positioned over respective edge notches 86a as shown in FIGURE 7. The recesses 86b can be, if desired, filled with a transparent, unsolidified, resilient potting compound of suitable index of refraction to receive the lamps 92 and, when solidified, cushions the lamps 92 and reduces the internal reflection of the light within the recesses 86b. The spring 80 and printed circuit sheet 78 are then secured to the light plate 76 by screws 82 engaging the tapped holes 86c as indicated in FIGURE 8. A wiper contact 94, which is U-shaped, is press-fitted onto each end of the legs 88a and 88b, and the ends of the conducting strips 78a and 78b (FIGURE 14) are placed in overlapping contact with the upper surface of their respective leg wiper contacts 94. A washer 96a is placed over each end of the printed circuit sheet 78 and a screw 96 is passed through a corresponding washer 96a and each respective apertures 88c and 88d (FIGURE 9) to be secured by a corresponding nut 98 as illustrated in FIGURE 8.

The cam-flaps 56 are positioned on the flat face 86f of the light plate assembly 54 such that the end cams 56a engage the spring fingers 80a as shown in FIGURE 5. This combination is then assembled with the housing assembly 52 by insertion of the light plate assembly 54 therein until the shoulders 84a and 84b of the light plate 76 engage the stud pins 72 and 74, respectively. A screw 100, threaded into a tapped hole near the end of the channel bar 58, extends into the recess 84c (FIGURE 9) of the light plate 76 and holds the light plate assembly 54 in place within the housing assembly 52. This produces the fully assembled check list holder 50 of FIGURES 3, 4 and 5.

The leg wiper contacts 94 (FIGURES 3 and 5) correspond, of course, to the wiper contacts 40 and 42 shown in FIGURE 1. When the wiper contacts 94 engage their corresponding electrically energized spring contacts, such as the spring contacts 44 and 46 of FIGURE 2, the lamps 92 (FIGURE 8) will be energized to light up the light plate 76, and this will illuminate a check list sheet placed directly in front of the white area or portion 86g (FIGURE 12). The check list sheet preferably has white, translucent lettering on a black, opaque background and can be installed in the holder 50 by slipping it down between the central portion 86g and the cam-flaps 56.

The flaps 56b of the cam-flaps 56, in the position shown in FIGURE 3, will obscure respective items listed on the check list sheet which is positioned directly behind the cam-flaps 56 and before the light plate 76. The tabs 56c extend slightly beyond the lower surface of the ledge 68 of flange 64 as shown in FIGURE 5 for easier access thereto. By pressing down on the tab 56c of a cam-flap 56, the cam-flap will be rotated 90 degrees such that the flap 56b will be moved from a flat position against the check list sheet to one which extends outwardly at right angles to the check list sheet, thus exposing the item formerly covered by the flap 56b. The tab 56c will, however, then be braced flatly against the surface of the check list sheet which is supported and illuminated by the central portion 86g of the face 86f of the light plate 76.

FIGURE 17 is a fragmentary perspective view of a cam-flap 56 shown working in cooperation with the corresponding pair of opposite spring fingers 80a, to illustrate the action of the over-center cams 56a with the pair of spring fingers 80a. The light plate 76, check list sheet and housing assembly 52 have been omitted from this view for clarity of illustration. The pair of cams 56a of the cam-flap 56 are identical in size, shape and orientation. Thus, the two cams 56a engage their respective spring fingers 80a in identical fashion. Each cam 56a is generally a disc which is circular for three quadrants and the remaining quadrant is in the shape of a right angular corner 102 formed from the intersection of the tangents to the adjacent ends of the quadrants which are contiguous to the remaining quadrant.

When the tab 56c of one of the cam-flaps 56 is depressed (pressed to the left in FIGURE 5), the cam-flap 56 will assume the position shown in FIGURE 17. The cams 56a of the particular cam-flap 56 are rotated from a position shown in FIGURE 5 in a clockwise direction to the position shown in FIGURE 17. The cams 56a are confined within a notch 86a (FIGURES 3 and 12) and between the lower end surface of a spring finger 80a and the upper surface of the ledges 66 and 68 of the flanges 62 and 64 (FIGURE 6). The apex of the corner 102 quadrant of a cam 56a momentarily deflects its cooperative spring finger 80a as the cam 56a is rotated between the positions shown in FIGURES 5 and 17. The spring finger 80a, of course, contacts one of the flat edges of the corner quadrant following rotation of the cam 56a to hold the cam-flap 56 in one position or the other.

In operation, after takeoff, for example, the check list holder 24 in FIGURE 1 is raised to its upright position and is automatically illuminated. If the cam-flaps are all in a "closed" position obscuring their respective items, all of the cam-flaps can be quickly set in their "open" position by manually running a finger along the edge of the holder 24 in a stroking movement against the projecting tabs of the cam-flaps, to expose all of the listed items to full view. As each item is checked off, the flap of its corresponding cam-flap is pressed to rotate that cam-flap to its "closed" position, thus obscuring the checked item from further view. An after takeoff list would itemize such check items as gear, flaps, landing lights, no smoking-seat belts, pressurization, anti-icing, fuel tank pumps, etc.

In an alternative method of using the check list holder 24, all of the cam-flaps are left or placed in their "closed" position. The uppermost tab is then manually deflected to rotate the cam-flap and reveal the item listed thereunder. This item is checked and then the next tab is deflected to rotate its cam-flap to reveal the next item to be checked. This is repeated in succession until all of the listed items have been checked. After all of the items have been checked off, the flaps of the rotated cam-flaps can be rapidly stroked and pressed back against the check list sheet to return the cam-flaps to their former, item obscuring position. The holder 24 can then be lowered to its closed position as shown in FIGURE 1 and its illumination will be automatically turned off.

FIGURE 18 is a fragmentary perspective view of a check list holder 104 which is similar to the check list holder 50 shown in FIGURES 3, 4 and 5 except that a different version of cam-flaps 106 is used. Since the check list holder 104 is essentially the same as the holder 50, the holder 104 has only been fragmentarily indicated in phantom lines. Four items on a check list sheet are schematically indicated by the rectangular strips 108a, 108b, 108c and 108d. Three cam-flaps 106 are also illustratively shown with these strips. It will be apparent from a comparison of FIGURES 17 and 18 that the cam-flaps 106 are different from the cam-flaps 56 essentially in the shape of the cover or obscuring elements thereof.

The cam-flaps 106 each have end cams 106a, a flap 106b and a flange 106c extending right angularly from the flap 106b as illustrated in FIGURE 18. The position of all the cam-flaps 106 is normally that as shown for the lowest cam-flap in FIGURE 18. The first item 108a is exposed to the view of an observer located in front of the check list holder 104. However, the other items 108b, 108c and 108d are obscured from view by the flanges 106c of the three cam-flaps 106. When the first item 108a is checked off, the uppermost cam-flap 106 is flipped upwards to the position illustrated. This exposes the second item 108b to full view while the first item 108a is simultaneously covered from the observer's view by the flap 106b of the uppermost cam-flap. After the second item 108b is checked off, the second or middle cam-flap 106 shown in FIGURE 18 is flipped up to expose the third item 108c and simultaneously cover the second item 108b. This can be continued successively until the last item is exposed and checked off.

It will be apparent that only a single item is exposed to view at any instant with the check list holder 104 whereas with the holder 50 shown in FIGURE 3, more than one item can be exposed at any one time. Each of the cam-flaps 106 can be constructed so that its flap 106b and respective flange 106c suitably obscure their corresponding check list items when the cam-flap 106 is in either its raised or lowered position and, additionally, if desired, permits the next lower cam-flap to clear the concerned cam-flap 106 when in its lowered position. Thus, the dimensions and angular arrangement of the flaps 106b and flanges 106c of the cam-flaps 106 shown in FIGURE 18 can be such that the uppermost cam-flap can be placed in its lowered position while the second cam-flap is in its raised position as illustrated. In this instance, both of the items 108a and 108c will be exposed to view at the same time.

My invention can, of course, be used in many different applications other than the exemplary one described for aircraft. It can obviously be used with all manned vehicles including cars, tanks, boats, ships, space vehicles, etc. as well as in homes, offices and factories. Further, the fold-up feature in the particular holder installation illustrated is dependent upon the environment. The holder device may, under appropriate circumstances, be preferably installed directly on a structure without having it mounted for folding in or out. It can, for example, be constructed to be hand-held for various uses. Moreover, the integral or internal lighting provided in my invention can be omitted where the device is used under sufficient daylight or other ambient light conditions.

It is to be understood, therefore, that the particular embodiment of my invention described above and shown in the drawings is merely illustrative of and not restrictive on the broad invention, and that various changes in design, structure and arrangement may be made without departing from the spirit and scope of the appended claims.

I claim:
1. A check list holder device comprising:
    a housing-plate structure including
        a plate member having a plurality of cam receiving notches,
        a plurality of spring elements, and
        cam retaining means cooperating with said spring elements, said spring elements being respectively aligned with said notches; and
    a plurality of cam-flap elements each including
        a two-position cam, and
        a cover flap, said cam-flap elements being positioned with said flaps normally adjacent a viewing surface of said plate member,
        said plate member, spring elements, cam retaining means and cam-flap elements being as- sembled whereby said cams of said cam-flap elements are respectively positioned in said notches for operation between said cam retaining means and a corresponding one of said spring elements.

2. A device as defined in claim 1 wherein said two-position cam includes an over-center cam having a generally right angular corner contour for engaging a corresponding one of said spring elements.

3. A device as defined in claim 1 wherein each of said cam-flap elements additionally has a tab which is oriented generally at a predetermined angle from said cover flap whereby operation of said tab facilitates movement of said cam from its normal position to its other position.

4. A device as defined in claim 3 wherein said tabs of said cam-flaps are aligned in a linear column whereby said cam-flaps can be rapidly set to their normal position by manual operation of said aligned tabs.

5. A device as defined in claim 1 wherein said cam-flap elements are formed to expose to view only a single item thereunder at any instant.

6. A device as defined in claim 5 wherein said cover flap of each of said cam-flap elements has a normally dependent flange which obscures the item thereunder from view when said cam is in one position, until the associated cam-flap element is operated to the other cam position and said flap then obscures a preceding item from view and exposes the item formerly obscured by said flange.

7. A device as defined in claim 1 wherein said plate member is an illuminable member which provides light from a face thereof when energized.

8. A device as defined in claim 7 wherein said housing-plate structure is mounted for rotation near one end, and said plate member has electrical contact means near said one end for engaging associated electrically energized contacts whereby when said housing-plate structure is rotated a predetermined amount, said contact means engages said electrically energized contacts to illuminate said plate member.

9. A device as defined in claim 8 including a printed circuit sheet having conductive leads thereon and lamp means connected to said leads, said circuit sheet being mounted to said plate member whereby said lamp means is positioned to illuminate said plate member internally and said leads being adapted to be connected to said contact means of said plate member.

10. A device as defined in claim 8 wherein said electrically energized contacts comprise formed spring means for maintaining said housing-plate structure in either of the rotated and unrotated positions.

References Cited by the Examiner

UNITED STATES PATENTS

| | | | |
|---|---|---|---|
| 1,154,854 | 9/1915 | Freeburn | 40—61 |
| 1,390,091 | 9/1921 | Carr | 40—68 |
| 1,961,973 | 6/1934 | Jenkins | 40—68 |
| 2,535,408 | 12/1950 | Grace | 40—61 X |
| 3,051,123 | 8/1962 | Grove | 116—131 X |

FOREIGN PATENTS 1,019,961  11/1952  France.

References Cited by the Applicant

UNITED STATES PATENTS

| | | | |
|---|---|---|---|
| 2,262,756 | 11/1941 | Claxton | 340—27 |
| 2,292,392 | 8/1942 | Miller | 340—27 |
| 2,718,628 | 9/1955 | Bartlett et al. | 340—27 |
| 3,110,499 | 11/1963 | Boeskool | 40—67 X |

HERBERT F. ROSS, *Examiner.*

EUGENE R. CAPOZIO, *Primary Examiner.*